United States Patent
Kragh et al.

(10) Patent No.: US 6,681,887 B1
(45) Date of Patent: Jan. 27, 2004

(54) METHOD FOR THE DETERMINATION OF LOCAL WAVE HEIGHTS AND ACOUSTIC SENSOR IN MARINE SEISMIC SIGNALS

(75) Inventors: Julian Edward Kragh, Little Sampford (GB); Leendert Combee, Oslo (NO)

(73) Assignee: WesternGeco, Houston, TX (US)

( * ) Notice: Subject to any disclaimer, the term of this patent is extended or adjusted under 35 U.S.C. 154(b) by 0 days.

(21) Appl. No.: 09/868,132
(22) PCT Filed: Nov. 18, 1999
(86) PCT No.: PCT/GB99/03837
§ 371 (c)(1), (2), (4) Date: Jun. 14, 2001
(87) PCT Pub. No.: WO00/37968
PCT Pub. Date: Jun. 29, 2000

(30) Foreign Application Priority Data

Dec. 18, 1998 (GB) .............................................. 9828066

(51) Int. Cl.⁷ ................................................. G01V 1/36
(52) U.S. Cl. ............................ 181/110; 367/21; 367/24
(58) Field of Search ................................. 181/108, 110, 181/118, 120; 367/16, 17, 21, 24, 48, 59

(56) References Cited

U.S. PATENT DOCUMENTS 4,353,121 A * 10/1982 Ray et al. ...................... 367/21
4,520,467 A * 5/1985 Berni ............................ 367/24

* cited by examiner

Primary Examiner—Khanh Dang
(74) Attorney, Agent, or Firm—Williams, Morgan & Amerson

(57) ABSTRACT

A method is provided for analyzing received seismic signals which are received from a plurality of seismic sensors in response to operation of an acoustic source during a marine seismic survey. The seismic sensors are located at different offsets from the acoustic source. The method comprises the steps of selecting a time window within a particular seismic signal which frames a relatively well-defined event represented in the signal. The particular seismic signal is received from a particular seismic sensor. The method further comprises determining a receiver ghost notch frequency from an amplitude/frequency spectrum of the seismic signal in the window and deriving from the receiver ghost notch frequency an estimate of a height of a water column above the particular seismic sensor which generated said particular seismic signal.

42 Claims, 3 Drawing Sheets

METHOD FOR THE DETERMINATION OF LOCAL WAVE HEIGHTS AND ACOUSTIC SENSOR IN MARINE SEISMIC SIGNALS

BACKGROUND OF THE INVENTION

The present invention relates to a method of analysing seismic signals and in particular to a method of analysing seismic signals adapted for use in connection with marine seismic data acquisition activities that provides for improved determination of local wave heights and acoustic sensor depths and allows "noise" in seismic data associated with changes in local wave heights and seismic sensor depths to be reduced during subsequent data processing.

Seismic data is collected to remotely sense subsurface geologic conditions, particularly in connection with the exploration for and production of hydrocarbons, such as oil and natural gas. To gather seismic data in a marine environment, acoustic sources, such as airguns, are used to produce an acoustic signal that is transmitted through the seawater and into the subsurface geologic formations. Changes in acoustic impedance at the sea bottom and between different geologic layers cause a portion of the acoustic energy to be reflected and returned toward the sea surface. These reflected signals are received by acoustic sensors and are processed to create images of the subsurface geology.

In a marine environment, these acoustic sensors (also called seismic sensors, often pressure sensors known as hydrophones) are typically contained within long tube-shaped streamers and are towed behind a seismic survey vessel. The streamers are often filled with kerosene or other buoyant materials that allow the sections of the streamers to achieve approximately neutral buoyancy. The streamers often have one or more internal stress members (such as steel cables) that provide substantial tensile strength and inhibit stretching of the streamer sections, while simultaneously allowing the streamer to be relatively flexible and able to be wound around a drum of a reasonable diameter on the seismic survey vessel. The depth (or "elevation") a streamer is towed at is typically regulated by a deflector located at the end of the streamer nearest the seismic survey vessel (see, for instance, our U.S. Pat. No. 5,357,892) and by control devices called birds that are typically placed at regular intervals along the streamer's length (see, for instance, our published PCT International Application No. WO 98/28636).

The depths of the hydrophones in the streamer are typically monitored on the seismic survey vessel by depth sensors attached to the birds. Because the birds are widely spaced along the streamer (such as every 300 meters), compared to the significantly closer hydrophone spacing (such as a group of hydrophones every 12.5 meters), the depth of a particular acoustic sensor or a group of acoustic sensors must typically be approximated by interpolating from the depth values of the birds on either side of the sensor or sensor group.

This type of relatively crude depth determination system makes it difficult for a seismic survey vessel crew to determine when certain types of problems are occurring within the streamers. For instance, streamer sections are typically "balanced" until they are approximately neutrally buoyant. Due to temperature changes on the seismic survey vessel and in the sea water, balancing problems (excessive positive or negative buoyancy) sometimes occur. If the depth of each of the hydrophone in each section could be monitored, however, it may be possible to determine which sections are experiencing balancing problems and to correct these problems before they impact the quality of the seismic data acquired or cause towing problems.

Depth sensors on the birds typically sense the local ambient water pressure and convert this pressure reading into a depth value. The water pressure measured at the bird, however, incorporates two types of transient conditions that are constantly changing as the streamer is towed. The first transient condition is the local wave height, the local sea level immediately above the sensor minus the mean sea level. Changes in the local wave height are also referred to as waves. The second transient condition is the actual streamer elevation (or depth) measured with respect to mean sea level. Changes in the actual streamer elevation are typically due to forces such as positive or negative buoyancy in the streamer sections, wave-induced forces, currents, the deflector, the birds, etc. The water pressure at the bird is influenced by both of these transient conditions. To eliminate wave effects, the measured water pressure values are typically averaged or filtered over an extended period of time (such as between 10 and 100 seconds). While this averaging or filtering produces more accurate "average" depth values for the birds, it eliminates any possibility of using the measured depth values to compensate for transient conditions having a cycle period less than half the averaging period or filter length, such as waves.

Two types of "noise" are introduced into the data by the fluctuations in the streamer depth and the local wave height. A first type of noise is caused by ghost effects. Acoustic reflections from the sea surface above an acoustic sensor or an acoustic source will cause cancellation of the received acoustic signals at frequencies that are related to the depth of the sensor or source (i.e. the "ghost" effect). Ghosts are notches in the frequency spectrum that occur at frequencies $F=n/T_g$, where n is an integer (0,1,2, ... ) and the ghost period $T_g$ is equal to twice the receiver (or source) depth H (distance to the sea surface) divided by the seawater acoustic transmission velocity. The depth H (and therefore the ghost notch frequency F) needs to be corrected for the angle of incidence (as will be discussed in more detail below). There are two ghosts, one introduced on the source side and one introduced on the receiver side. Variations in the ghost notch frequency occur when the depth of the receiver or source varies. These variations can be due to a change in the absolute elevation of the streamer or the source or due to changes in the wave height above the streamer or the source.

To compensate for this ghost effect, seismic sensors are typically towed at a depth where the first non-zero ghost notch frequency is outside the seismic spectrum (between approximately 5 Hz and approximately 80 Hz) where the vast majority of information regarding the geologic subsurface of interest is obtained during a seismic survey. A deconvolution procedure can be used to compensate for the frequency-dependent attenuation of the received seismic signals caused by the ghost effect (i.e. "de-ghosting" the data). In conventional seismic data processing procedures, however, this deconvolution procedure will assume that the seismic sensors are placed a constant distance beneath the sea surface. Any deviation in the position of the sensor from this assumed position will cause the de-ghosting procedure to operate to some degree improperly; certain frequencies will be over amplified and certain frequencies will remain under amplified. In that the depth values are averaged or otherwise filtered over an extended period of time to remove wave effects on the depth values, the depth values provided by conventional seismic data acquisition equipment cannot be used to provide customised or individualised de-ghosting of the seismic data to account for the actual (and changing) depth values of the sensors when they were receiving the seismic data of interest.

A second type of noise is due to changes in the absolute elevation of the streamer which causes unintended shifts in the arrival times of the acoustic signals received from the underlying seismic reflectors. As the vast majority of seismic data analysis involves combining together numerous seismic traces imaging the same subsurface position, these time shifts will cause a blurring of the seismic image of the reflectors.

While these two types of deviations do not introduce "noise" in its conventional sense (i.e. unwanted signals that interfere with or mask the desired signals), it will be readily understood that they inhibit proper seismic imaging of the subsurface and therefore constitute noise in its more general sense. For some types of seismic imaging, such as analysing time-lapsed images of producing hydrocarbon reservoirs, these effects may be sufficient to mask any change in the seismic response that could be expected to result from the withdrawal of reservoir fluids. A study conducted on behalf of the Applicant has concluded that if conventional seismic data processing schemes are utilised, rough sea effects from only a 2 meter significant wave height (SWH) sea can mask any changes in seismic response that could be expected to be associated with hydrocarbon production, at least for certain reservoir types.

In conventional marine seismic surveying, the only attempts made to compensate for changes in local sea height involve compensating for changes in mean sea level due to tidal effects. No attempt is made to correct the seismic data for wave effects or short cycle-time variations in the streamer depth values. While it is well known that the quality of seismic data will be seriously degraded if the seismic data is acquired during rough sea periods, no attempt is normally made to compensate for these type of transient conditions. When a seismic survey vessel crew or their client's onboard observer decides that the sea conditions are too rough or fail to meet the agreed upon contractual specifications, acquisition of seismic data by the seismic survey vessel is simply stopped. The client is simply forced to live with the fact that seismic data acquired during rougher sea conditions is noisier (i.e. of lower quality) than seismic data acquired during calmer sea conditions.

Seismic data acquisition contractors have a significant incentive to acquire seismic data under "questionable" weather conditions because they are not typically compensated for downtime resulting from bad weather and the amount of time spent down for bad weather can easily range between 10% and 50% of the entire mobilisation period. Some seismic data acquisition contractors are particularly aggressive about continuing seismic data acquisition activities in bad weather. This is particularly true when the seismic survey vessel is acquiring multi-client data. Multi-client data is typically acquired "on-spec" with the seismic contractor paying for the cost of the acquisition activities and then attempting to recoup these costs and make a profit by licensing access to the acquired seismic data. Some contractors apparently believe that the effects of bad weather can be removed (or at least masked) during subsequent data processing or that the clients may not realise how noisy the data actually is. This situation has been further complicated in the past because clients have lacked a method for independently determining what the sea state was when the seismic data was acquired.

It is therefore an object of the present invention to provide for an improved method of analysing seismic signals.

An advantage of the described embodiment of the present method is that it allows local wave heights and acoustic sensor elevations to be determined in connection with marine seismic data acquisition activities.

A further advantage of the described embodiment of the present invention is that it provides an objective method for determining the local wave heights directly from seismic data.

Another advantage of the described embodiment of the present invention is that the elevations of individual acoustic sensors or arrays of acoustic sensors may be determined in the absence of conventional water-pressure-based depth sensors.

An additional advantage of the described embodiment of the present invention is that "noise" introduced into the seismic data by changes in local wave heights and/or changes in seismic sensor elevations may be attenuated during subsequent data processing.

SUMMARY OF THE INVENTION

The present invention involves a method of analysing seismic signals acquired by a plurality of submerged seismic sensors in response to operation of an acoustic source during a marine seismic survey, the method comprising, for each of at least some of the signals, the steps of: selecting a time window within the signal which frames a relatively well-defined event represented in the signal; determining the receiver ghost notch frequency from the amplitude/frequency spectrum of the signal in said window; and deriving from said receiver ghost notch frequency an estimate of the height of the water column above the sensor which produced the signal. The method may further include the steps of: identifying changes in arrival times from seismic signals received by a plurality of submerged acoustic sensors located at different offsets from an acoustic source; determining time differences between the identified changes in arrival times and expected changes in arrival times associated with an assumed acoustic sensor depth profile; and converting the time differences into depth differences between the assumed acoustic sensor depth profile and the actual depth profile of said acoustic sensors. This method provides for improved determination of local wave heights and acoustic sensor elevations and allows "noise" in seismic data associated with changes in local wave heights and seismic sensor elevations to be attenuated during subsequent data processing.

DETAILED DESCRIPTION OF THE INVENTION

Figure 1:
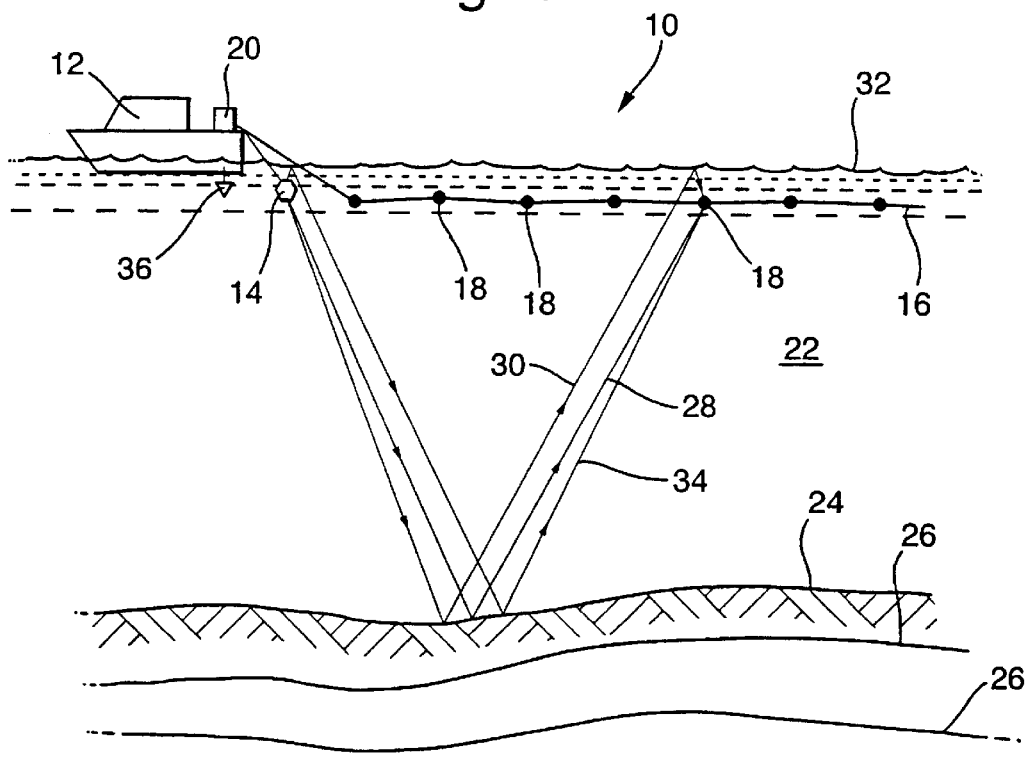
FIG. 1 is a schematic diagram of a seismic survey vessel conducting a marine seismic survey.

FIG. 1 shows a schematic view of a seismic survey vessel and associated equipment conducting a marine seismic survey. A conventional marine seismic survey system 10 comprises a seismic survey vessel 12, an acoustic source 14, one or more streamers 16 (each containing a plurality of hydrophones 18, a type of acoustic sensor), and recording equipment 20. When acquiring seismic data using the seismic survey system 10, the acoustic source 14 (typically one or more airguns) produces an acoustic pulse which is transmitted through the seawater 22 and is partially reflected by both the sea bottom 24 and by the interfaces 26 between various geologic layers where the acoustic impedances of the layers change.

When acquiring seismic data using this type of seismic survey system 10, the most prominent reflection event recorded will typically be the direct waterbottom arrival 28. The direct waterbottom arrival 28 can also be thought of as a first portion 28 of the acoustic pulse produced by acoustic source 14 that reflects directly off the sea bottom 24 and is received directly by the hydrophone 18. A second portion 30 of the acoustic pulse reflects off the sea bottom 24, reflects off the sea surface 32 above the hydrophone 18, and is then received by the hydrophone. This second portion 30 (known as the receiver ghost signal) is out of phase with respect to the first portion 28 and will result in destructive interference of the received acoustic signal at the receiver ghost notch frequencies, as discussed above. A third portion 34 of the acoustic pulse reflects off the sea surface 32 immediately above the acoustic source 14 before reflecting off the sea bottom 24 and being received by the hydrophone 18. This third portion 34 will similarly be out of phase with respect to the first portion 28 and will result in the destructive interference of the received acoustic signal at the source ghost notch frequencies. While the first portion 28, second portion 30, and third portion 34 are shown as raypaths, this is merely for convenience and it should be understood that acoustic signals spread in a generally spherical manner and that similar raypaths would exist between the acoustic source 14 and each of the hydrophones 18. The seismic survey vessel 12 is also typically be equipped with a depth sounder 36 that allows the water depth beneath the vessel to be monitored.

Figure 2:
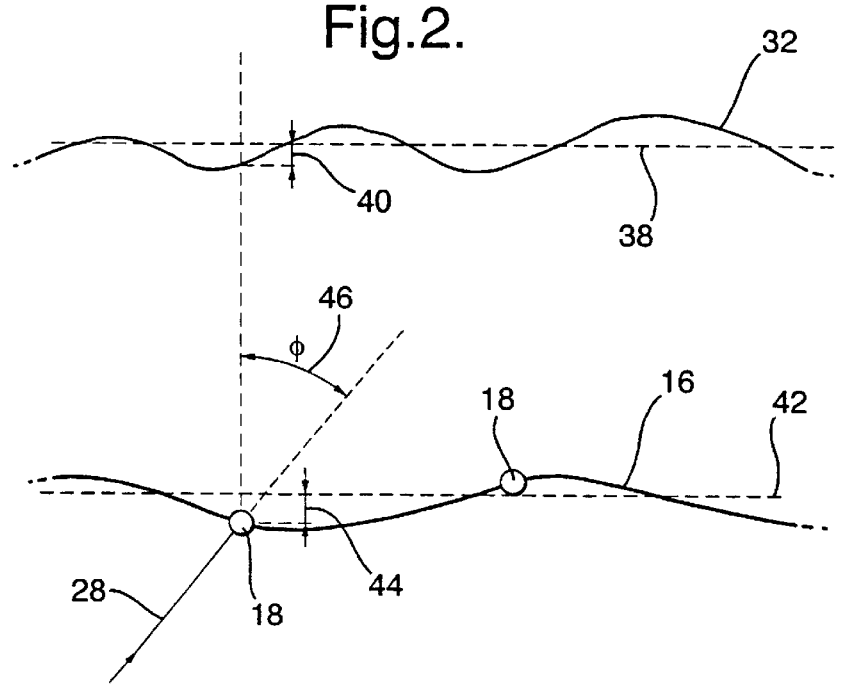
FIG. 2 is an enlarged view of a portion of the seismic streamer and the sea surface from FIG. 1.

FIG. 2 shows an enlarged portion of the seismic streamer 16 and the sea surface 32 from FIG. 1 at a particular instant in time. The sea surface 32 is overlain by a dashed mean sea level 38 reference line. The mean sea level 38 is typically compensated for tidal effects and will ideally represent the sea level that would exist if the seas in the area were completely calm. Sea height variation 40 quantifies the distance the sea surface 32, directly above hydrophone 18, is above or below this mean sea level 38. Similarly, the streamer 16 and the hydrophones 18 are overlain by a dashed desired streamer depth 42 reference line. This desired streamer depth 42 typically represents the depth below the mean sea level 38 that the streamer 16 is intended to be towed at. Even if the deflector and birds are functioning properly, however it is understood that the streamer 16 will undulate to a certain degree and that the hydrophones 18 within the streamer will not be precisely located at the desired streamer depth 42. Sensor depth variation 44 quantifies the distance the hydrophone 18 is above or below the desired streamer depth 42. The degree of the sea height variation 40 and sensor depth variation 44 has been exaggerated in FIG. 2 for illustrative purposes. Also shown in FIG. 2 is an offset angle 46, also referred to as theta, that represents the angle between the direct waterbottom arrival 28 raypath and a vertical raypath. This offset angle 46 is used later to describe calculations made in the preferred embodiment of the present invention.

Figure 3:
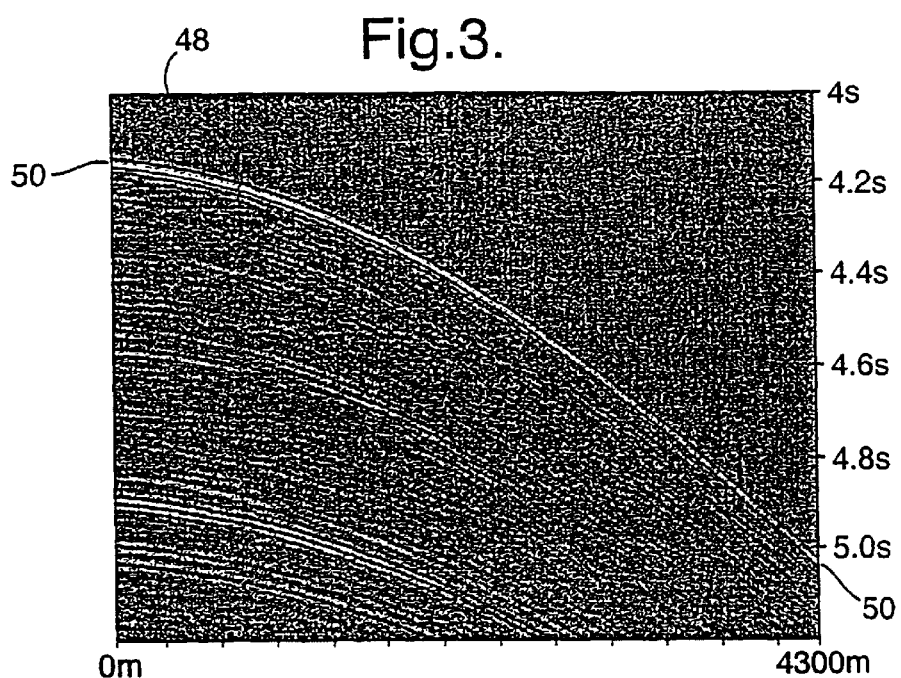
FIG. 3 is a panel of seismic traces received from a single acoustic pulse.

FIG. 3 is a seismic trace panel 48 showing a number of seismic traces that have been received by the hydrophones 18 on a single streamer 16 from a single acoustic pulse produced by an acoustic source 14. Those of ordinary skill in the art will understand that these seismic traces reflect changes in the water pressure amplitude measured by each of the hydrophones 18 over time. The first and most visible event in this seismic trace panel 48 is the direct waterbottom arrival 50. In this case, the time required for an acoustic pulse produced by the acoustic source 14 to reach the sea bottom 24 and be reflected to the hydrophone 18 nearest the seismic survey vessel 12 is approximately 4.2 seconds (the water depth is about 3100 meters in this example). The time required for the direct waterbottom arrival portion of this same pulse to reach the hydrophone 18 farthest from the seismic survey vessel 12 is just over 5 seconds. It was noted that the sea state was about 2 meters significant wave height and the angle of incidence of the direct waterbottom arrival raypath at the far offsets was about 35 degrees when this particular seismic trace panel 48 was acquired.

Figure 4:
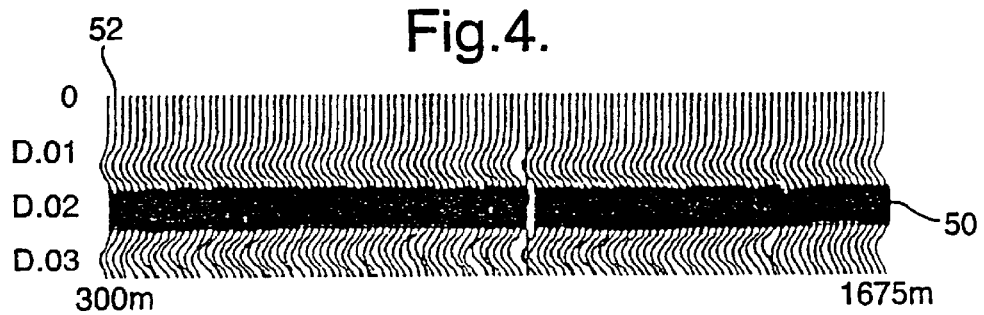
FIG. 4 is a windowed portion of seismic traces from FIG. 3 after the sea bottom reflections have been aligned at approximately the same arrival time.

FIG. 4 shows windowed portions 52 of the seismic traces from FIG. 3 after the direct waterbottom arrivals 50 have been moveout corrected so they align at approximately the same time and an identical 32 millisecond portion of each trace (including the direct waterbottom arrival 50) has been selected. No "stretching" of the windowed portion of the trace from FIG. 3 has taken place. The trace has not been normal moveout corrected to attempt to create an equivalent zero offset trace. The time window has merely been time shifted so the direct waterbottom arrival 50 appears in approximately the same place in the window for each of the traces.

It should be understood that the local sea height directly above the hydrophone 18 is constantly changing as the seismic data is being acquired. The time variant nature of this problem smears the ghost notch that would be obtained for the entire seismic trace. To address this, a short time window (preferably less than approximately 250 milliseconds) is selected to provide a "snap-shot" of the water column height in the vicinity of the acoustic sensor over a relatively short period of time. In the preferred embodiment, this is the period of time immediately before and immediately after the direct waterbottom arrival 50 is received by the hydrophone 18. The use of these short time windows, however, can cause traditional wavelet extraction methods (which could be used for determining ghost notch frequencies) to fail, due (for example) to the failure of the stationary wavelet assumption. Amplitude versus frequency spectra are preferably used instead to determine the receiver ghost notch frequencies for each of the selected time windows.

Figure 5:
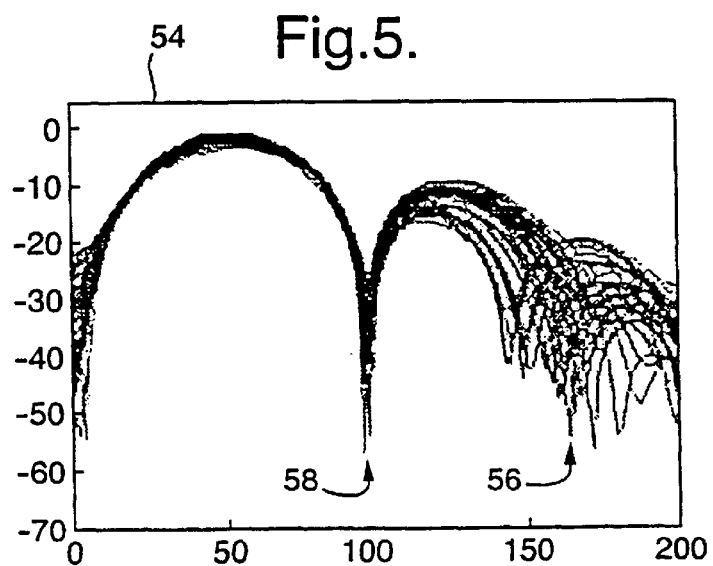
FIG. 5 is a plot showing amplitude versus frequency spectrums of the windowed seismic traces from FIG. 4.

FIG. 5 is a plot showing amplitude versus frequency spectra for a number of the windowed portions of the seismic traces from FIG. 4 (traces having offsets of 0 to 800 meters). FIG. 5 shows how the source notch frequencies 58 are virtually constant for each of the traces (because the seismic traces came from a single acoustic source pulse so the source notch frequencies will only vary by the cosine of the arrival incidence angle) while the receiver notch frequencies 56 vary significantly because the water column height above each of the hydrophones 18 in the streamer 16 is different, primarily due to wave effects.

If the source depth is close to the receiver depth, the two ghost notches will be close in frequency and it may be difficult to distinguish between them and to make accurate picks. This is most simply addressed by placing the source and receivers at different depths. The required depth separation is not simple to define as it depends on the notch variation, which is principally determined by the wave heights. If the source and receiver are separated in depth by at least half of the maximum peak-to-trough wave height (the significant wave height), then it is unlikely that the notches would ever be coincident.

Other methods for distinguishing between the source and receiver notches can also be used. The source notch frequency 58 typically varies less than the receiver notch frequency 56 because the airgun suspension system "rides" on the waves, keeping the source ghost period more consistent. Also, by working in the common-shot domain, the source notch frequency 58 will be constant (although it varies with the cosine of the incidence angle) for all receivers associated with the same shot. The apparent ghost notch period decreases with offset by the cosine of the angle of incidence from the vertical. This moveout curve needs to be removed from the notch picks before inversion to local sea surface height either through computation using the offsets and water depth, or by fitting a best-fit smooth curve through the picks (such as a cosine type curve or a second or third order polynomial curve). The offset will also affect the lateral position of the inverted sea surface points since the reflection points will no longer be vertically above the receivers. As discussed below, this lateral shift with offset is easily corrected.

As discussed above, inversion of the receiver ghost frequency to calculate the height of the water column above the acoustic sensor is quite straightforward. If the first non-zero receiver ghost notch frequency is selected, the height of the water column can be estimated as follows:

$$WCH = (ATV)/(2*RGNF*COS(THETA))$$

where:
WCH=Water Column Height
ATV=Acoustic Transmission Velocity
RGNF=First Non-Zero Receiver Ghost Notch Frequency
THETA=Arrival Incidence Angle If, for instance, a hydrophone 18 having a 400 meter offset has an arrival incidence angle of 2 degrees (THETA=2 degrees, cosine of THETA 0.9994), the first non-zero receiver ghost notch frequency is found at 160 Hz (RGNF= 160), and the acoustic transmission velocity of seawater is 1460 meters per second (ATV=1460), then the water column height above the hydrophone may be estimated by the following calculation:

$$WCH = (1460)/(2*160*0.9994) = 4.6 \text{ meters}$$

The approximate depth of the source and receiver, the water depth, and the offset distance will typically be known, allowing the THETA value to be calculated quite accurately.

While the above formula provides an estimate of the water column height above the hydrophone 18. it more precisely estimates the water column height above a horizontal plane passing through the hydrophone for a point that is WCH*TAN(THETA) closer to the source than the hydrophone, because this is the lateral position at which the second portion 30 of the acoustic pulse is assumed to have reflected off the sea surface 32.

The above method allows estimates of the water column height in the vicinity of a particular acoustic sensor to be determined from the determined receiver ghost notch frequency 56. If these calculations are made for a number of different hydrophones 18 in a streamer 16, and the assumption is made that the hydrophones 18 are horizontal, the local sea state may also be determined. A refinement of this method allows deviations between the actual positions of the hydrophones 18 and this horizontal alignment assumption to be determined as well.

If changes in arrival times can be identified for a group of acoustic sensors located at different offsets from an acoustic source, and if time differences can be determined between these identified time changes and the time changes that would be expected if the acoustic sensors were positioned at a particular depth profile, then it is possible to convert these determined time differences into depth differences between the assumed sensor profile and the actual depth profile.

Figure 6:
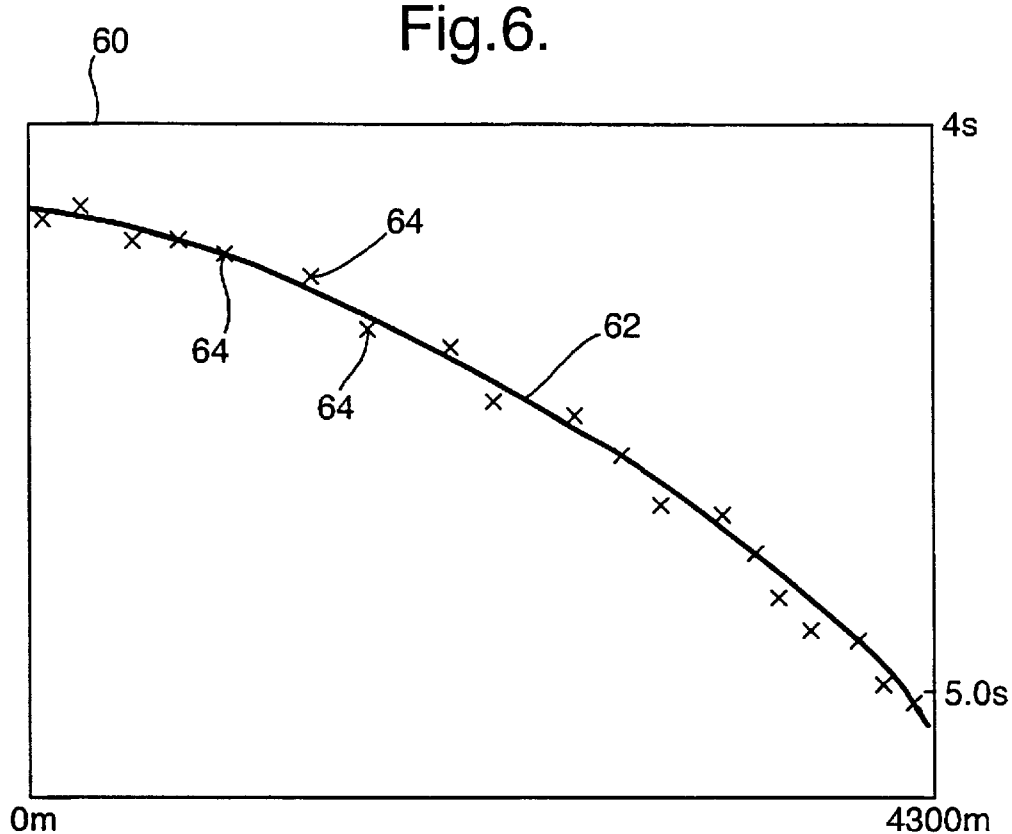
FIG. 6 is a chart plotting waterbottom reflection arrival times versus offset distances and a travel time moveout curve.

FIG. 6 is a cross-plot 60 showing an expected waterbottom reflection travel time moveout curve 62 and actual waterbottom reflection arrival time picks 64. The extent of the deviations between the arrival time picks 64 and the travel time moveout curve 62 have been greatly exaggerated in FIG. 6 to more clearly describe the process. The travel time moveout curve 62 associates expected arrival times for the direct waterbottom reflection 28 with offset distances (the distances between the acoustic source 14 and the hydrophones 18). The expected arrival times correspond to the travel times that would be expected if each of the sensors 18 were located precisely at the desired streamer depth 42.

The arrival time picks 64 represent the actual direct waterbottom arrival time for the hydrophone 18 located at that particular offset and these time picks are made from the seismic traces shown in seismic trace panel 48. While it would be possible to use other techniques to identify these reflector arrival times (or equivalently changes in reflector arrival times), such as by using correlation techniques to determine the arrival time shift between adjacent traces or windowed portions of adjacent traces, Applicants have found that good results can be obtained by precisely picking the wavelet onset time for the direct waterbottom arrival reflection. Preferably, the arrival time picks 64 should be made to the nearest 0.1 millisecond, which corresponds to an accuracy of approximately 15 centimeters. If the seismic signals are recorded at a sampling interval greater than 0.1 millisecond, it may be necessary to interpolate the recorded values to properly select the event arrival time with sufficient accuracy. Any swell noise in the received seismic signals should be removed, preferably with a minimum-phase low-cut filter. It is also preferable to pick as near to the wavelet onset as possible (first arrival, first peak), so that the varying ghost arrivals do not interfere with the time picks. If correlation techniques were used to determine the change in event arrival times, it would be preferable to severely limit the portions of the traces that are correlated, to avoid the source and/or receiver ghosts from interfering with the accurate determination of the event arrival time differences.

The travel time moveout curve 62 maps expected changes in arrival times with changing offsets for a given acoustic sensor depth profile. In this described embodiment, as will be the case for virtually all towed streamer-related applications of this method, the assumed acoustic sensor depth profile is horizontal, i.e. parallel to the desired streamer depth 42. Estimations or assumptions regarding the source/ receiver offset distances, the source depth, the average receiver depth, the reflection point depths, and/or the acoustic transmission velocity (or velocities) can be used to constrain the travel time moveout curve 62.

In the most simplistic model, the streamer 16 is assumed to be horizontal, the sea bottom 24 is assumed to be horizontal, the seawater 22 is assumed to have a single acoustic transmission velocity, and therefore the expected waterbottom travel time moveout curve 62 is expected to be a simple hyperbola (i.e. the direct waterbottom arrival will show what geophysicists refer to as "normal moveout" or "hyperbolic moveout"). A hyperbola that best fits the actual waterbottom reflection arrival time picks 56 can be then be selected and used to determine the time differences between the expected reflector arrival times and the actual reflector arrival time (or, equivalently, between the expected changes and the actual changes in the reflector arrival time). In practice, a third order polynomial curve has typically been fitted to the arrival time picks 56 to produce the travel time moveout curve 62. The third polynomial coefficient allows some degree of variation in the simplistic assumptions identified above.

More sophisticated assumptions can also be made regarding the appropriate travel time moveout curve 62. The depth measurements from the depth sounder 36 can be used, for instance, to produce a profile of the sea bottom surface. This sea bottom profile and the designed layout of the acoustic source 14 and the hydrophones 18 can be used to produce an expected travel time moveout curve 62. This model-based calculated travel time moveout curve 62 can further be fitted to the sea bottom arrival picks 62. Physical parameters that effect the expected travel time moveout values, such as slowly changing sea bottom structures, variations in water velocity with depth, and directivity effects of the wavelet, may similarly be modelled to determine an appropriate travel time moveout curve 62. It is also possible to identify these parameters by looking for correlations across the results obtained from different acoustic pulses.

The distance the hydrophone 18 is above or below the desired streamer depth 42 can be calculated using the following formula:

$$AASE=EASE+((ARAT-ERAT)*ATV)/COS(THETA)$$

where:
AASE=Actual Acoustic Sensor Elevation
EASE=Expected Acoustic Sensor Elevation
ARAT=Actual Reflection Arrival Time
ERAT=Expected Reflection Arrival Time
ATV=Acoustic Transmission Velocity
THETA=Arrival Incidence Angle If, for instance, the hydrophone 18 at 2000 meter offset has an expected elevation of −5 meters (EASE −5), the expected waterbottom reflection arrival time from the travel time moveout curve 54 for 2000 meter offset is 4.4050 seconds (ERAT 4.4050), the actual waterbottom reflection arrival time identified from the seismic trace acquired by the hydrophone is 4.4046 seconds (ARAT 4.4046), the acoustic transmission velocity of seawater is 1460 meters per second (ATV=1460), and the arrival incidence angle is 20 degrees (THETA=20 degrees, and the cosine of THETA=0.9397), then the actual acoustic sensor elevation may be calculated as follows:

$$AASE=-5+((4.4046-4.4050)*1460)/0.9397=-5.6 \text{ meters}$$

While any seismic event at a different depth than the source and receivers could be used in the method (such as a dominant seismic reflector in the geologic area of interest), the water-bottom reflection is generally the strongest reflection in the seismic record and it is often possible to accurately isolate this event from other interfering reflections. The sea bottom is also often relatively flat (or at least has a relatively uniform gradient over the distances of interest) and this greatly simplifies the process of selecting an appropriate travel time moveout curve 62. The actual acoustic sensor elevation may then be used to "fine tune" the estimate of the local sea heights discussed previously by correcting the estimated water column height by the distance the sensor is above or below the desired streamer depth 42.

Figure 7:
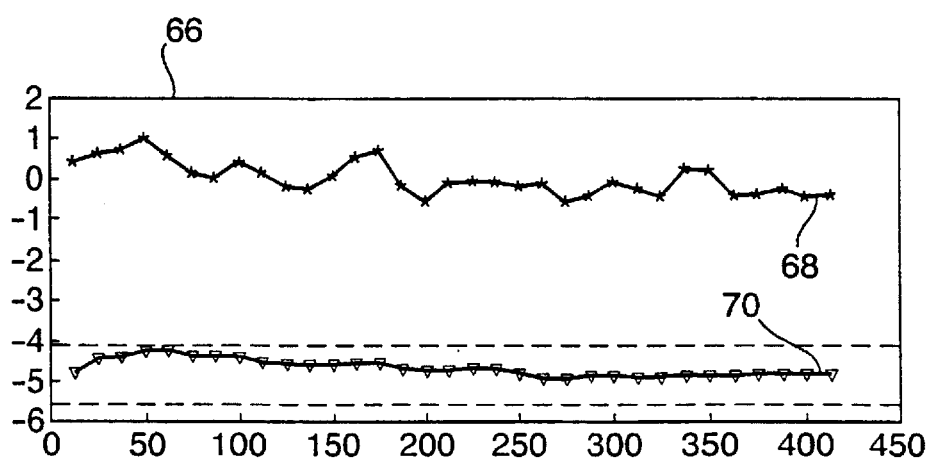
FIG. 7 is a plot showing seismic sensor depths and local sea heights determined in accordance with the present invention for a group of seismic traces shown in FIG. 3.

FIG. 7 is a cross plot 66 showing local sea heights 68 and streamer depths 70 determined in accordance with the present invention for some of the seismic traces shown in FIG. 3. These traces have offsets of 300 to 725 meters, with the bottom scale representing the relative distance from the sensor nearest the seismic survey vessel. This plot represents a "snap-shot" picture of the sea surface height above the sensors and the seismic sensor depths below mean sea level for a short time period around the time when the direct sea bottom arrival reached each of the hydrophones 18. The time of the snap-shot values for the larger offsets is therefore a fraction of a second later than the time of the snap-shot values for the smaller offsets. Mean sea level 38 is assumed to be zero depth, and all depths are plotted relative to this level. Because the calculated local sea height 68 values have been adjusted for both the local water column heights and the deviations between the desired streamer depth and the actual streamer depth, mean sea level 38 may be determined by simply averaging the calculated sea surface heights over a relatively large range of offsets. A correction has been made for the lateral shift with offset (the WCH*TAN (THETA) correction mentioned above), although at these small arrival angles (<13 degrees), this makes little difference. The intended streamer depth 42 was 5 meters, with the birds set to control the depth to plus or minus 1 meter, and it can be seen that the actual streamer depths 70 determined in accordance with the inventive method fall within these excursion limits.

While the inventive method has been described in connection with point receiver streamer acquisition equipment (i.e. the seismic signals received by each individual hydrophone is recorded) and better resolution may be obtained for this type of data, the method may also be used with conventional group formed data (i.e. the seismic signals received by a group of adjacent hydrophones are added together before being recorded). Under at least some conditions, when using single sensor data, local sea heights and streamer depths can be expected to be determined by the inventive method with a precision greater than plus or minus 50 centimeters.

The inventive method may be used to monitor local wave heights and seismic sensor elevations during marine seismic data acquisition activities. This may be useful, for instance, to monitor the sea state to ensure compliance with contractual obligations regarding weather conditions. It may also be useful for monitoring the impact that the sea state is having on in-sea equipment such as the streamers, the deflectors and the birds. The determined sensor depth values can also be used to control sensor positioning devices, such as the deflector and the birds.

This method may also be useful in subsequent seismic data processing applications. Seismic data acquired under non-ideal weather conditions may be reprocessed and the local wave heights and seismic sensor elevations may be determined for each seismic sensor (or seismic sensor group). This information can be used to evaluate the sea conditions that were present when the seismic data was acquired and how accurately the hydrophones were maintained at their desired depth. The seismic data can be further reprocessed using this information to better de-ghost the data (i.e. tune the deconvolution operator to account for the actual distance between the seismic sensor and the sea surface rather than the assumed distance between the seismic sensor and the sea surface) and to correct the reflector arrival times for the time shift caused by the seismic sensor being at the actual elevation rather than at the desired elevation.

Because the method can be performed using seismic data acquired using conventional seismic data acquisition techniques and equipment, the method can be used to significantly improve the imaging characteristics of seismic data acquired in non-optimal weather conditions. Most seismic surveys acquire a great deal of data over areas that, in the end, do not identify potential hydrocarbon prospects. In those areas that do show significant potential, however, it may be advantageous to reprocess the seismic data using the inventive method to "fine tune" the seismic image of the prospect under investigation.

While the embodiment of the present invention described above utilises the direct waterbottom arrival (and therefore determines the acoustic sensor elevations and local wave heights at the time the direct waterbottom arrival reaches each hydrophone), the invention is not restricted to the use of this arrival. In particular, in certain circumstances a water salinity interface reflection is produced, and this reflection can be used in place of the direct waterbottom arrival. Additionally, other seismic reflectors and refractors can be used with the inventive method. Although the arrival times for these other seismic reflectors will typically not be as easy to pick and the ghost notches will be less distinct than those associated with the direct waterbottom arrivals, if two or more time-lapsed local wave heights and acoustic sensor elevations can be determined for a particular seismic trace, this opens up the possibility of extrapolating the values to improve the image for a particular geologic target of interest. If we are interested, for instance, in a hydrocarbon reservoir located at a depth of 5,000 meters, and the acoustic sensor elevation and local wave height values for a particular trace determined from the direct sea bottom arrival are −5.6 meters and 1.2 meters respectively, and the acoustic sensor elevation and local wave height values for that trace when determined from a dominant geologic reflector located at 3,000 meters are −5.8 meters and 1.0 meters respectively, it may be desirable to time shift and de-ghost this trace using the extrapolated values of −5.9 meters and 0.9 meters respectively. In this way, it may be possible to more accurately image the geologic target of interest.

In some cases, particularly for relatively large offsets, the first recorded seismic event may be a refracted, rather than reflected, arrival. The refracted arrivals travel from the acoustic source to the sea bed, along the sea bed, and then up to the acoustic receiver. These refracted arrivals will demonstrate the same type of receiver ghost notch discussed with respect to the waterbottom arrival 50, although the arrival angle, theta, will be constant. The travel time moveout curve 62 for refracted arrivals may also, as a first order approximation, be linear, rather than hyperbolic. By making relatively minor changes to the preferred embodiment method described above using waterbottom reflections, these refracted arrivals may also be used to determine local wave heights and seismic sensors elevations. Preferably the seismic reflector or refractor event used with the inventive method will be earlier in the seismic record than other types of arrivals to limit interference caused by "pseudo-ghosts" and other types of acoustic interference caused by alternative transmission modes.

While the described embodiment of the present invention utilises a conventional seismic source, such as an airgun, as the acoustic source and utilises a conventional seismic sensor, such as a hydrophone, as the acoustic sensor, the invention is not limited to the use of such devices. It is also possible to use one or more dedicated non-seismic acoustic sources, such as pingers or sparkers. Conventional airguns work well with the inventive method primarily because they typically produce a broadband acoustic signal. If dedicated acoustic sources are used with the method, it may be preferable to place them at the front, middle, and end of the streamers 16 because the method appears to work best when the offset angle 46 is approximately 45 degrees or less.

Similarly, it is possible to use dedicated non-seismic acoustic sensors that are intended to receive the direct sea bottom acoustic reflection arrival. Conventional hydrophones work particularly well with the inventive method because they are highly accurate and have good high frequency response. However, it may not be necessary to obtain the streamer depth and local wave height measurements with the same spatial sampling interval as the hydrophones 18 are placed in the streamer 16. If dedicated sensors and processing equipment are used to determine the local wave height above the sensors and the elevation of the sensors, it may be preferable to space the dedicated sensors at a greater spatial sampling interval than the hydrophones 18 and to sample the reflected portion of the acoustic signal at a sampling interval significantly smaller than the 2 or 3 millisecond sampling interval used in conventional seismic data acquisition (such as every 0.1 millisecond). The seismic signals may similarly not be "seismic data" that is used to analyse the geologic subsurface. It may instead by acquired solely in connection with making the measurements described above. While the preferred embodiment of the invention is described using conventional hydrophones 18 (water pressure sensors), the method will work in a similar manner with geophones (particle velocity sensors), accelerometers, and other types of acoustic sensors. The receiver ghost notch frequency 56 is directly related to the difference in the arrival times of the direct waterbottom arrival 28 and the receiver ghost signal 30. Alternative embodiments of the inventive method that utilise receiver ghost signal 30 travel time measurements to estimate the height of the water column may also be used.

While the described embodiment of the present invention is depicted in connection with conventional towed marine streamer seismic data acquisition, the method is not limited to this type of environment. It may be similarly used in ocean-bottom cable, vertically deployed seismic sensor groups, and other types of seismic data acquisition systems.

What is claimed is:

1. A method of analyzing received seismic signals which are received from a plurality of seismic sensors in response to operation of an acoustic source during a marine seismic survey, comprising the steps of:

selecting a time window within a particular seismic signal which frames a relatively well-defined event represented in the signal, said particular seismic signal being received from a particular sensor;

calculating an amplitude/frequency spectrum of seismic signals generated by the seismic sensors, wherein said amplitude/frequency spectrum contains both a source ghost notch frequency and a receiver ghost notch frequency;

determining the receiver ghost notch frequency from the amplitude/frequency spectrum of said seismic signal in said window, by distinguishing said receiver ghost notch frequency from said source ghost notch frequency on a basis of a relative variability of the receiver ghost notch frequencies and the source ghost notch frequencies; and deriving from said receiver ghost notch frequency an estimate of a height of a water column above said particular sensor which generated said particular seismic signal.

2. The method of claim 1, wherein said event is a reflection from a relatively strong acoustic reflector below the seismic sensors.

3. The method of claim 2, wherein said relatively strong acoustic reflector is a sea bottom.

4. A method of analyzing received seismic signals which are received from a plurality of seismic sensors in response to operation of an acoustic source during a marine seismic survey, wherein said seismic sensors are located at different offsets from said acoustic source, comprising the steps of:
  selecting a time window within a particular seismic signal which frames a relatively well-defined event represented in the signal, said particular seismic signal being received from a particular seismic sensor;
  determining a receiver ghost notch frequency from an amplitude/frequency spectrum of said seismic signal in said window; and
  deriving from said receiver ghost notch frequency an estimate of a height of a water column above said particular seismic sensor which generated said particular seismic signal, wherein deriving the estimate of the height of the water column comprises the steps of:
    identifying changes in arrival times from seismic signals received by the seismic sensors;
    determining time differences between the identified changes in arrival times and expected changes in arrival times associated with an assumed seismic sensor depth profile; and
    converting said time differences into depth differences between said assumed seismic sensor depth profile and an actual depth profile of said seismic sensors.

5. The method of claim 4, wherein the step of identifying changes in arrival times comprises the step of identifying arrival times associated with a common reflector from said seismic signals received by said seismic sensor, and wherein the step of determining time differences comprises the step of determining time differences between the identified arrival times and corresponding times from a travel time moveout curve associating expected changes in arrival times with changes in offset for said assumed seismic sensor depth profile.

6. The method of claim 5, wherein said common reflector is a sea bottom.

7. The method of claim 4, wherein the received seismic signals are filtered before said changes in arrival times are identified.

8. The method of claim 7, wherein the filtering of said received seismic signals is performed using a minimum-phased low-cut filter.

9. The method of claim 4, wherein said received seismic signals are digitized at a sampling interval and said time differences are determined to a precision which is finer than said sampling interval by interpolating between the digitized received seismic signals.

10. The method of claim 4, wherein said expected changes in arrival times are calculated using a profile of a sea bottom surface.

11. The method of claim 4, further comprising the step of correcting said received seismic signals by shifting said received seismic signals by the determined time differences.

12. The method of claim 4, wherein the estimated water column height is combined with said depth difference to estimate a local wave height in a vicinity of said seismic sensor relative to mean sea level at a time of the marine seismic survey.

13. The method of claim 12, wherein estimates of local wave heights are calculated for a plurality of acoustic sensors and are used to evaluate a sea state at a time of the marine seismic survey.

14. The method of claim 4, further comprising the step of producing a display of local sea conditions using the estimate of the height of the water column.

15. A method of performing a marine seismic survey, comprising the steps of:
  analyzing seismic signals generated by a plurality of submerged seismic sensors in response to operation of an acoustic source during said marine seismic survey, the analyzing step comprising the steps of:
    selecting a time window within a particular seismic signal which frames a relatively well-defined event represented in the signal, a particular sensor adapted to generate said particular seismic signal;
    calculating an amplitude/frequency spectrum of seismic signals generated by said acoustic sensor, wherein said amplitude/frequency spectrum contains both a source ghost notch frequency and a receiver ghost notch frequency;
    determining a receiver ghost notch frequency from an amplitude/frequency spectrum of said seismic signal in said window, wherein determining the receiver ghost notch frequency comprises distinguishing said receiver ghost notch frequency from said source ghost notch frequency on a basis of a relative variability of the receiver ghost notch frequencies and the source ghost notch frequencies; and
    deriving from said receiver ghost notch frequency an estimate of a height of a water column above said particular sensor which generated said particular seismic signal.

16. The method of claim 15, wherein said event is a reflection from a relatively strong acoustic reflector below the seismic sensors.

17. The method of claim 16, wherein said relatively strong acoustic reflector is a sea bottom.

18. The method of claim 15, further comprising calculating estimates of local wave heights for a plurality of acoustic sensors and using said estimates to evaluate a sea state at a time of the marine seismic survey.

19. A method of performing a marine seismic survey, comprising the steps of:
  analyzing seismic signals generated by a plurality of submerged seismic sensors in response to operation of an acoustic source during said marine seismic survey, wherein said seismic sensors are located at different offsets from said acoustic source, the analyzing step comprising the steps of:
    selecting a time window within a particular seismic signal which frames a relatively well-defined event represented in the signal, a particular sensor adapted to generate said particular seismic signal;
    determining a receiver ghost notch frequency from an amplitude/frequency spectrum of said seismic signal in said window; and
    deriving from said receiver ghost notch frequency an estimate of a height of a water column above said particular sensor which generated said particular seismic signal, wherein deriving the estimate comprises:
      identifying changes in arrival times from seismic signals received by the seismic sensors;

determining time differences between the identified changes in arrival times and expected changes in arrival times associated with an assumed seismic sensor depth profile; and converting said time differences into depth differences between said assumed seismic sensor depth profile and an actual depth profile of said seismic sensors.

20. The method of claim 19, wherein:

the step of identifying changes in arrival times comprises the step of identifying arrival times associated with a common reflector from said seismic signals received by said seismic sensor, the step of determining time differences comprises the step of determining time differences between the identified arrival times and corresponding times from a travel time moveout curve associating expected changes in arrival times with changes in offset for said assumed seismic sensor depth profile.

21. The method of claim 20, wherein said common reflector is a sea bottom.

22. The method of claim 19, wherein the received seismic signals are filtered before said changes in arrival times are identified.

23. The method of claim 22, wherein the filtering of said received seismic signals is performed using a minimum-phased low-cut filter.

24. The method of claim 19, wherein said received seismic signals are digitized at a sampling interval and said time differences are determined to a precision which is finer than said sampling interval by interpolating between the digitized received seismic signals.

25. The method of claim 19, wherein said expected changes in arrival times are calculated using a profile of a sea bottom surface.

26. The method of claim 19, further comprising the step of correcting said received seismic signals by shifting said acquired seismic signals by the determined time differences.

27. The method of claim 19, wherein the estimated water column height is combined with said depth difference to estimate a local wave height in a vicinity of said seismic sensor relative to mean sea level at a time of the maritime seismic survey.

28. The method of claim 27, wherein said depth differences are used to control a deflector or a bird that controls the depth of said seismic sensors.

29. The method of claim 28, wherein said acoustic source is placed at a different depth than said seismic sensors.

30. A computer apparatus adapted for storing instructions, said instructions, when executed by said computer apparatus, conducting a signal analysis method comprising the steps of:

analyzing received seismic signals which are generated by a plurality of a seismic sensors in response to operation of an acoustic source during a marine seismic survey, the analyzing step further including the steps of:

selecting a time window within a particular seismic signal which frames a relatively well-defined event represented in the signal, a particular sensor adapted to generate said particular seismic signal;

calculating an amplitude/frequency spectrum of seismic signals generated by said acoustic sensor, wherein said amplitude/frequency spectrum contains both a source ghost notch frequency and a receiver ghost notch frequency;

determining the receiver ghost notch frequency by distinguishing said receiver ghost notch frequency from said source ghost notch frequency on a basis of a relative variability of the receiver ghost notch frequencies and the source ghost notch frequencies; and deriving from said receiver ghost notch frequency an estimate of a height of a water column above said particular sensor which generated said particular seismic signal.

31. The computer apparatus of claim 30, wherein said event is a reflection from a relatively strong acoustic reflector below the seismic sensors.

32. The computer apparatus of claim 31, wherein said relatively strong acoustic reflector is a sea bottom.

33. A computer apparatus adapted for storing instructions, said instructions, when executed by said computer apparatus, conducting a signal analysis method comprising the steps of:

analyzing received seismic signals which are generated by a plurality of a seismic sensors in response to operation of an acoustic source during a marine seismic survey, wherein said seismic sensors are located at different offsets from said acoustic source, the analyzing step further including the steps of:

selecting a time window within a particular seismic signal which frames a relatively well-defined event represented in the signal, a particular sensor adapted to generate said particular seismic signal;

deriving from said receiver ghost notch frequency an estimate of a height of a water column above said particular sensor which generated said particular seismic signal by performing the steps of:

identifying changes in arrival times from seismic signals received by the seismic sensors;

determining time differences between the identified changes in arrival times and expected changes in arrival times associated with an assumed seismic sensor depth profile; and converting said time differences into depth differences between said assumed seismic sensor depth profile and an actual depth profile of said seismic sensors.

34. The computer apparatus of claim 33, wherein:

the step of identifying changes in arrival times comprises the step of identifying arrival times associated with a common reflector from said seismic signals received by said seismic sensor, and the step of determining time differences comprises the step of determining time differences between the identified arrival times and corresponding times from a travel time moveout curve associating expected changes in arrival times with changes in offset for said assumed seismic sensor depth profile.

35. The computer apparatus of claim 34, wherein said common reflector is a sea bottom.

36. The computer apparatus of claim 33, wherein the received seismic signals are filtered before said changes in arrival times are identified.

37. The computer apparatus of claim 36, wherein the filtering of said received seismic signals is performed using a minimum-phased low-cut filter.

38. The computer apparatus of claim 33, wherein said received seismic signals are digitized at a sampling interval and said time differences are determined to a precision which is finer than said sampling interval by interpolating between the digitized received seismic signals.

39. The computer apparatus of claim 33, wherein said expected changes in arrival times are calculated using a profile of a sea bottom surface.

40. The computer apparatus of claim 33, further comprising the step of correcting said acquired seismic signals by shifting said acquired seismic signals by the determined time differences.

41. The computer apparatus of claim 33, wherein the estimated water column height is combined with said depth difference to estimate a local wave height in a vicinity of said seismic sensor relative to mean sea level at a time of the marine seismic survey.

42. The computer apparatus of claim 33, wherein estimates of local wave heights are calculated for a plurality of seismic sensors and are used to evaluate a sea state at a time of the marine seismic survey.

* * * * *